US008649329B2

(12) United States Patent
Kawasaki et al.

(10) Patent No.: US 8,649,329 B2
(45) Date of Patent: Feb. 11, 2014

(54) COMMUNICATION SYSTEM, BASE STATION, MOBILE TERMINAL, AND COMMUNICATION METHOD

(75) Inventors: Yoshihiro Kawasaki, Kawasaki (JP); Yoshiharu Tajima, Kawasaki (JP); Yoshiaki Ohta, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 59 days.

(21) Appl. No.: 13/328,085

(22) Filed: Dec. 16, 2011

(65) Prior Publication Data

US 2012/0087289 A1 Apr. 12, 2012

Related U.S. Application Data

(63) Continuation of application No. PCT/JP2009/063414, filed on Jul. 28, 2009.

(51) Int. Cl.
*H04Q 7/00* (2006.01)
*H04Q 7/24* (2006.01)

(52) U.S. Cl.
USPC .......................................... 370/328; 370/338

(58) Field of Classification Search
USPC ......... 370/311, 326, 328–330, 336, 338, 341, 370/343, 345, 436
See application file for complete search history.

(56) References Cited

U.S. PATENT DOCUMENTS

| 5,150,362 | A * | 9/1992 | Akerberg | 370/331 |
| 5,485,463 | A * | 1/1996 | Godoroja | 370/333 |
| 6,563,806 | B1 * | 5/2003 | Yano et al. | 370/330 |
| 6,735,446 | B1 | 5/2004 | Iwata et al. | |
| 7,636,337 | B2 * | 12/2009 | Parantainen et al. | 370/336 |
| 8,054,792 | B2 * | 11/2011 | Higuchi et al. | 370/329 |
| 2003/0088695 | A1 * | 5/2003 | Kwak et al. | 709/238 |
| 2006/0116123 | A1 | 6/2006 | Purnadi et al. | |
| 2006/0274712 | A1 * | 12/2006 | Malladi et al. | 370/345 |
| 2007/0055778 | A1 * | 3/2007 | Park et al. | 709/226 |
| 2009/0219861 | A1 * | 9/2009 | Higuchi et al. | 370/328 |
| 2010/0322158 | A1 * | 12/2010 | Lee et al. | 370/329 |

FOREIGN PATENT DOCUMENTS

JP 2008522472 6/2008

OTHER PUBLICATIONS

Extended European search report including the supplementary European search report and the European search opinion issued for corresponding European Patent Application No. 09847792.0, dated Feb. 28, 2013.

Japanese International Preliminary report on Patentability (IPRPI) with English translation issued for corresponding Japanese Patent Application No. PCT/JP2009/063414 issued Jul. 28, 2009.

(Continued)

*Primary Examiner* — Hong Cho
(74) *Attorney, Agent, or Firm* — Myers Wolin, LLC

(57) ABSTRACT

A communication system transmits a paging signal from a base station to a mobile terminal, via a designated carrier among multiple carriers. The communication system includes the base station that transmits the paging signal via the designated carrier, and further transmits via a carrier that is among the carriers and not the designated carrier, information that indicates the designated carrier; and the mobile terminal that based on the information received via a carrier to which the mobile terminal is connected, connects to the designated carrier and receives the paging signal transmitted via the designated carrier.

11 Claims, 12 Drawing Sheets

(56) References Cited

OTHER PUBLICATIONS

English translation of the International Search Report issued for corresponding International Patent Application No. PCT/JP2009/063414, dated Oct. 16, 2009.

Nokia, Nokia Siemens Networks, L1 control signaling with carrier aggregation in LTE-Advanced, 3GPP TSG-RAN WG1 Meeting #54bis R1-083730, Sep. 29-Oct. 3, 2008. Referenced in the International Search Report for corresponding International Patent Application No. PCT/JP2009/063414.

3GPP TS 36.106 V8.1.0 (Mar. 2009), 3rd Generation Partnership Project; Technical Specification Group Radio Access Network; Evolved Universal Terrestrial Radio Access (E-UTRA); FDD Repeater radio transmission and reception; (Release 8). Referenced in paragraph [0061] of the Specification.

3GPP TS 36.304 V8.5.0 (Mar. 2003), 3rd Generation Partnership Project; Technical Specification Group Radio Access Network; Evolved Universal Terrestrial Radio Access (E-UTRA); User Equipment (UE) procedures in idle mode (Release 8). Referenced in paragraph [0009] of the Specification.

3GPP TS 36.300 V8.8.0 (Mar. 2009), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8). Referenced in paragraph [0009] of the Specification.

Extended European search report including the European search report or the partial European search report / declaration of no search and the European search opinion, issued for corresponding European Patent Application No. 12185533.2, dated Jan. 18, 2013.

Fujitsu; "Anchor component carrier"; Agenda Item: 12.2; 3GPP TSG-RAN1 #55bis; R1-090382; Ljubljana, Slovenia; Jan. 12-16, 2008.

Fujitsu; "Anchor component carrier for Idle-mode LTE-A UE"; Agenda Item: 15.7; 3GPP TSG-RAN1 #56bis; R1-091504; Seoul, ROK; Mar. 23-27, 2009.

CMCC; "Further considerations on anchor carrier for CA"; Agenda Item: 7; 3GPP TSG-RAN WG2 Meeting #66; R2-093263; San Francisco, USA; May 4-8, 2009.

CMCC; "Idle mode camping and measurement for CA"; Agenda Item: 7.3; 3GPP TSG-RAN WG2 Meeting #66bis; R2-093982; Jun. 29-Jul. 3, 2009; Los Angeles, USA.

Notice of Rejection issued for corresponding Japanese Patent Application No. 2011-524562, mailed Jul. 16, 2013, with English translation.

* cited by examiner

COMMUNICATION SYSTEM, BASE STATION, MOBILE TERMINAL, AND COMMUNICATION METHOD

CROSS REFERENCE TO THE RELATED APPLICATIONS

This application is a continuation application of International Application PCT/JP2009/063414, filed Jul. 28, 2009, and designating the U.S., the entire contents of which are incorporated herein by reference.

FIELD

The embodiments discussed herein are related to a communication system, a base station, a mobile terminal, and a communication method.

BACKGROUND

Under the 3rd Generation Partnership Project (3GPP), LTE-Advanced LTE (LTE-A), an expansion of LTE, is being investigated. Under LTE-A, wireless carriers (carrier) of an LTE system are bundled affording a broader range of transmission band than the LTE system and thereby enabling higher data transmission capacity. The respective LTE wireless carriers that are bundled are referred to as component carriers.

An LTE compliant terminal transmits and receives data using one of the component carriers that a LTE-A base station has. An LTE-A compliant terminal (LTE-A terminal) uses one component carrier or simultaneously uses multiple component carriers to transmit and receive data. The number of component carriers and the center frequency of each component carrier are assumed to differ between adjacent base stations. Furthermore, continuous as well as discontinuous arrangement along the component carrier frequency axis at a given base station is also assumed.

A terminal in idle mode is registered (terminal position registration) in one tracking area. Tracking area information is unique information that differs for each terminal. Multiple base stations belong to one tracking area. The base stations that belong to each tracking area differ for each terminal.

When an idle terminal is paged, all of the base stations in the tracking area to which the terminal belongs transmit a paging signal. Upon receiving the paging signal, the terminal prepares to transition from the idle mode to an active mode. When the terminal, for example, transitions from the idle mode to the active mode, a network notifies the terminal of information (identifying information of a base station belonging to the tracking area) related to the tracking area of the terminal.

The idle terminal periodically receives a common control signal transmitted from each cell and based on the identifying information that is unique to a base station and included in the received common control signal, the terminal determines whether the terminal is still in the tracking area or outside the tracking area. When outside the tracking area, the terminal accesses a base station that has transmitted the common control signal or the base station that has the greatest reception power and is the nearest. The terminal further has the base station update the position registration information of the terminal. As a result, the tracking area to which the terminal belongs is updated.

None of the base stations can ascertain whether a given idle terminal is within the cell thereof. Although a mobility management entity (MME), which is an entity at a higher level than the base stations, can determine that the given idle terminal is among the base stations that are subordinate to the MME, the MME cannot ascertain in which base station cell the given idle terminal is located. When the idle terminal is paged, a paging signal is transmitted from the cells of all of the base stations belonging to the current tracking area of the terminal.

When an LTE-A terminal transitions from the active mode to the idle mode, the base station that managed the terminal in the active mode ceases management of the terminal. Having transitioned to the idle mode, the terminal receives a common control signal from one component carrier among multiple component carriers. Even if the terminal moves from the current cell to another cell, provided the terminal does not leave the tracking area, the other cell also does not recognize the presence of the terminal. When the terminal is paged from the network, base stations belonging the tracking area in which the terminal is currently present, transmit a paging signal. For reference, see, for example, 3GPP TS36.300, V8.8.0, March 2009 and 3GPP TS36.304, V8.5.0, March 2009.

However, the technology above poses a problem in that paging signals cannot be efficiently transmitted and received. For example, when the same paging signal is received from the component carriers of all of the base stations, the efficiency of wireless resource utilization diminishes. Further, for the base stations within the tracking area, whether an idle terminal is present within the cell thereof is unclear and by consequently transmitting the same paging signal, the efficiency of wireless resource utilization diminishes.

Further, if the paging signal is transmitted via a portion of the component carriers of the base stations, it is unclear whether a paging signal is transmitted via any of the component carriers and thus, the terminal cannot receive the paging signal. On the contrary, if the terminal receives the paging signal from all of the base station component carriers, power consumption of the terminal in the idle mode increases.

In light of the problems above, an object of one aspect of the present invention is to provide a communication system, a base station, a mobile terminal, and a communication method that solve the problems above and perform highly efficient transmission and reception of paging signals.

SUMMARY

According to an aspect of an embodiment, a communication system transmits a paging signal from a base station to a mobile terminal, via a designated carrier among multiple carriers. The communication system includes the base station that transmits the paging signal via the designated carrier, and further transmits via a carrier that is among the carriers and not the designated carrier, information that indicates the designated carrier; and the mobile terminal that based on the information received via a carrier to which the mobile terminal is connected, connects to the designated carrier and receives the paging signal transmitted via the designated carrier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 1:
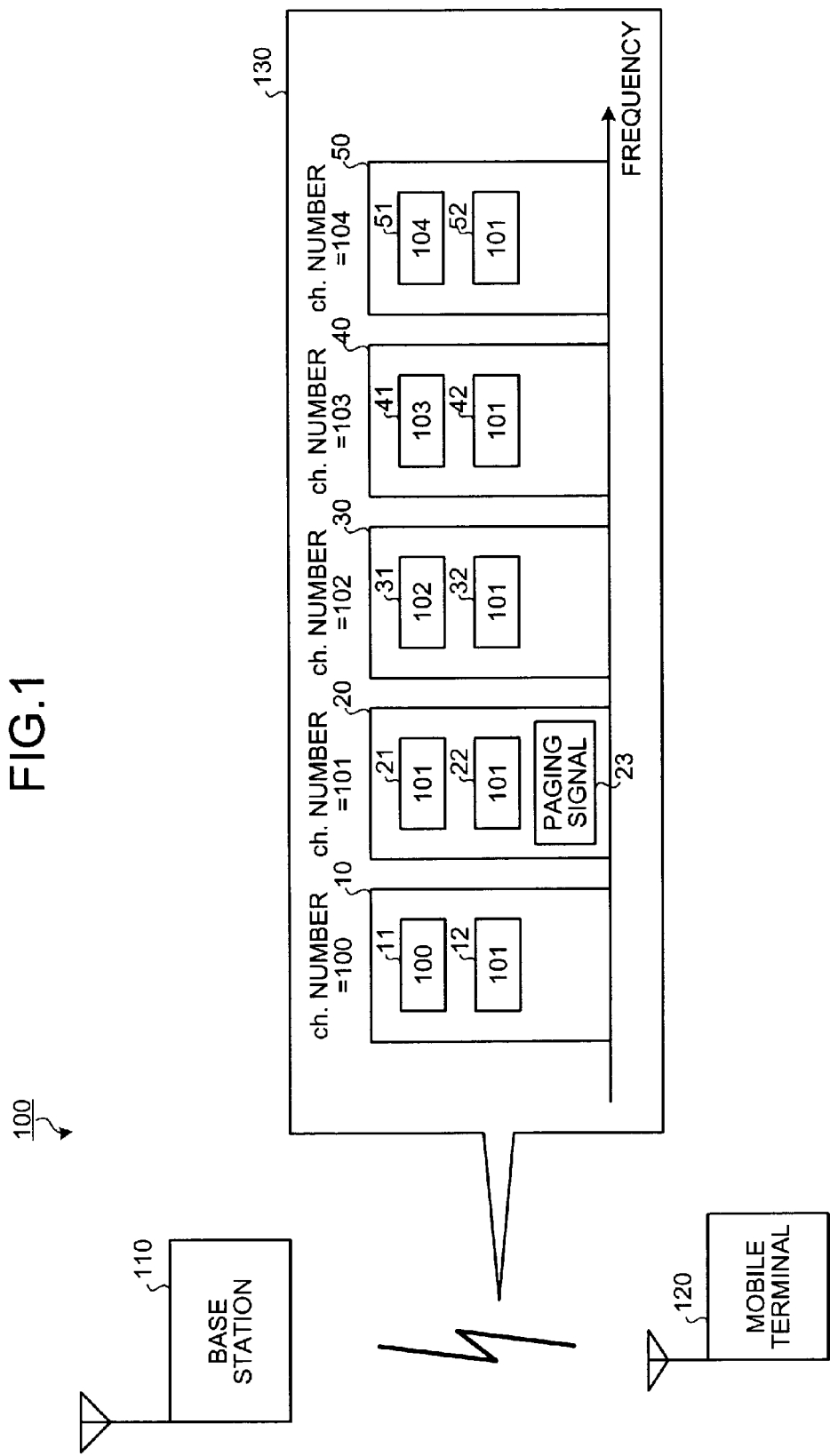
FIG. 1 is a diagram of a communication system according to a first embodiment.

FIG. 1 is a diagram of a communication system according to a first embodiment. As depicted in FIG. 1, a communication system 100 according to the first embodiment includes a base station 110 and a mobile terminal 120. The communication system 100 is a wireless communication system that transmits a paging signal from the base station 110 to the mobile terminal 120 via a portion of the component carriers. Hereinafter, "component carrier" is referred to as "carrier".

Reference numeral 130 indicates each carrier transmitted by the base station 110 to the mobile terminal 120. As depicted by reference numeral 130, the base station 110 transmits carriers 10, 20, 30, 40, and 50 to the mobile terminal 120. Carriers 10, 20, 30, 40, and 50 are carriers of mutually differing frequencies. Carriers 10, 20, 30, 40, and 50 are respectively assigned different channel numbers (ch. number) "100", "101", "102", "103", and "104".

In this example, the base station 110 is assumed to include a paging signal 23 in carrier 20 and no paging signals in carriers 10, 30, 40, or 50. Hereinafter, for example, a carrier that includes a paging signal such as carrier 20 is referred to as a "designated carrier".

Carrier 10 transmitted by the base station 110 includes a channel number 11 and designated carrier information 12. The channel number 11 indicates the channel number "100" of carrier 10, which is a carrier of the base station 110. The designated carrier information 12 indicates channel number "101" of carrier 20, which is the designated carrier.

Carrier 20 transmitted by the base station 110 has a channel number 21 and designated carrier information 22. The channel number 21 indicates the channel number "101" of carrier 20, which is a carrier of the base station 110. The designated carrier information 22 indicates the channel number "101" of carrier 20, which is the designated carrier.

Similarly, carriers 30, 40, and 50 transmitted by the base station 110 respectively include channel numbers 31, 41, 51 and designated carrier information 32, 42, 52. The channel numbers 31, 41, and 51 respectively indicate the channel numbers "102", "103", and "104" of carriers 30, 40, and 50. The designated carrier information 32, 42, and 52 indicate the channel number "101" of carrier 20, which is the designated carrier.

In this manner, the base station 110 transmits a paging signal via carrier 20 (designated carrier) and further transmits the designated carrier information 12, 32, 42, and 52 indicating carrier 20, via carriers 10, 30, 40, and 50, respectively.

The mobile terminal 120 receives the designated carrier information from the carrier to which the mobile terminal 120 is connected. For example, when the mobile terminal 120 transitions to the idle mode, the mobile terminal 120 connects to a preliminarily determined carrier and receives the designated carrier information from the carrier. Based on the received designated carrier information, the mobile terminal 120 connects to carrier 20 (performs handover to a different carrier) and receives the paging signal 23 from carrier 20.

Further, for example, assuming that when the mobile terminal 120 transitioned to the idle mode, the mobile terminal 120 was connected to carrier 10, in this case, the mobile terminal 120 receives the designated carrier information 12 from carrier 10 and the mobile terminal 120 connects to carrier 20 indicated by the received designated carrier information 12.

In this manner, designated carrier information indicating carrier 20, which transmits the paging signal, is transmitted from the base station 110 via the other carriers 10, 30, 40, and 50. Thus, the mobile terminal 120 can connect to carrier 20, which carries the paging signal. Consequently, highly efficient transmission and reception of paging signals can be performed.

Further, since designated carrier information is transmitted via all carriers 10, 30, 40, and 50 that are not the designated carrier, among the carriers 10, 20, 30, 40, and 50, even if the mobile terminal 120 has connected to any one of carriers 10, 30, 40, and 50, designated carrier information can be received and the mobile terminal 120 can easily and more quickly connect to carrier 20.

However, the designated carrier information need not be transmitted via all of the carriers 10, 30, 40, and 50 that are not the designated carrier. For example, configuration may be such that the designated carrier information is not transmitted via a portion of the carriers 10, 30, 40, and 50. In this case as well, the mobile terminal 120 switches reception carriers until a carrier that includes the designated carrier information is received, enabling the mobile terminal 120 to receive the designated carrier information and thus, the mobile terminal 120 can easily and more quickly connect to carrier 20.

Although here an example has been described where carrier 20, which is the designated carrier, also includes the designated carrier information 22, configuration may be such that the designated carrier information is not included in the designated carrier. In this case as well, for example, if the carrier to which the mobile terminal 120 was connected when transitioning to the idle mode was the designated carrier, by detecting a paging signal, the mobile terminal 120 is able to recognize that the connected carrier was the designated carrier.

Figure 2:
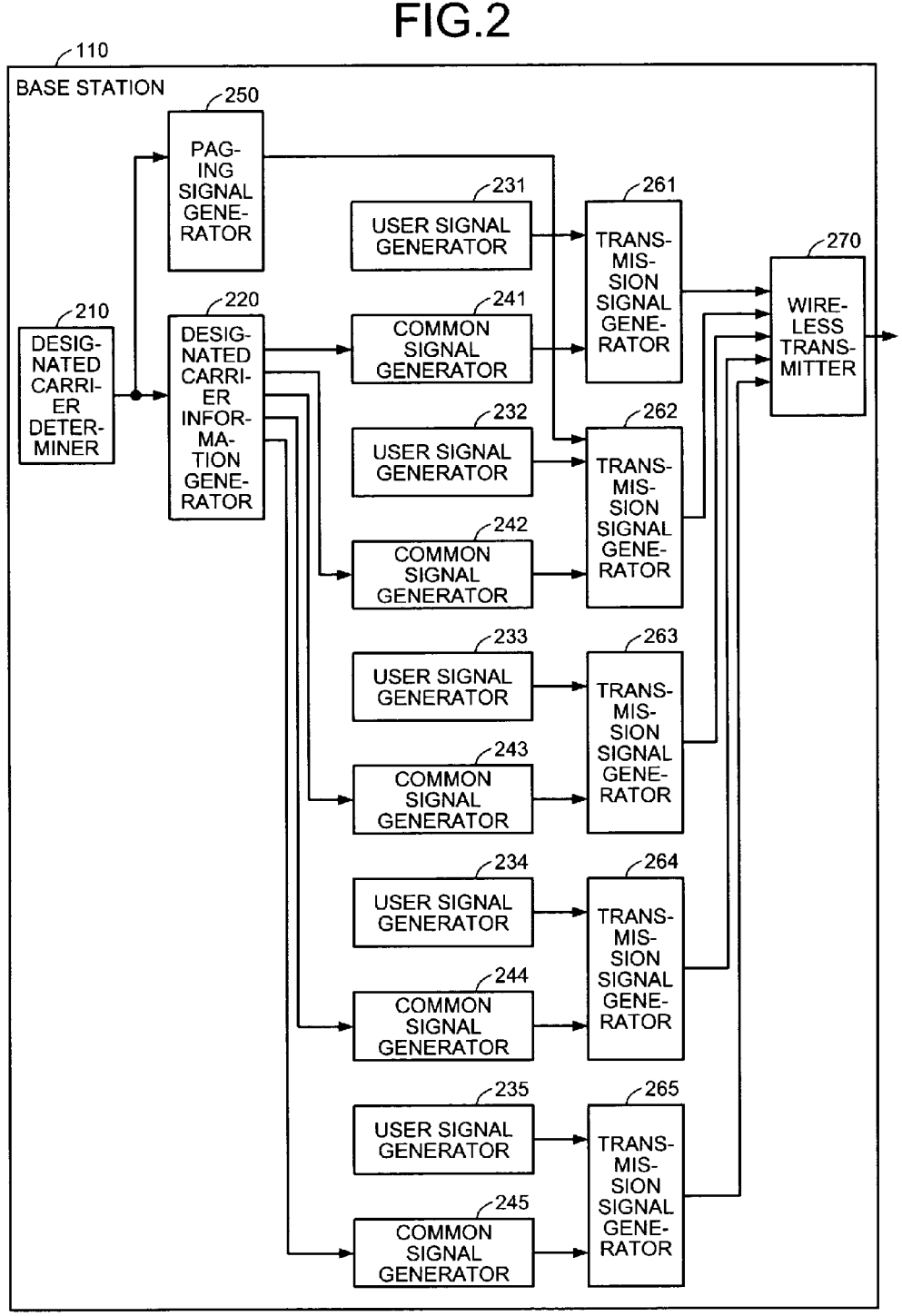
FIG. 2 is a block diagram of an example of a configuration of a base station depicted in FIG. 1.

FIG. 2 is a block diagram of an example of a configuration of the base station depicted in FIG. 1. As depicted in FIG. 2, the base station 110 includes a designated carrier determiner 210, a designated carrier information generator 220, user signal generators 231 to 235, common signal generators 241 to 245, a paging signal generator 250, transmission signal generators 261 to 265, and a wireless transmitter 270.

The designated carrier determiner 210 determines a designated carrier, from among carriers 10, 20, 30, 40, and 50, and notifies the designated carrier information generator 220 and the paging signal generator 250 of the determined designated carrier. For example, the designated carrier determiner 210 reads out designated carrier information preliminarily stored to memory of the base station 110 and determines the carrier indicated by the read information to be the designated carrier. In this example, the designated carrier determiner 210 is assumed to determine carrier 20 to be the designated carrier as depicted in FIG. 1.

The designated carrier information generator 220 generates designated carrier information that indicates the designated carrier (here, carrier 20) indicated by the designated carrier determiner 210. The designated carrier information generated by the designated carrier information generator 220 is, for example, a value representing the channel number of the designated carrier, as depicted in FIG. 1. The designated carrier information generator 220 outputs the generated designated carrier information to the common signal generators 241 to 245, respectively.

The user signal generator 231 generates a user signal that is to be transmitted via carrier 10 and outputs the generated user signal to the transmission signal generator 261. Similarly, the user signal generators 232 to 235 respectively generate user signals that are to be transmitted via carriers 20, 30, 40, and 50, respectively, and output the generated user signals to the transmission signal generators 262 to 265, respectively. Each user signal generated by the user signal generators 231 to 235, for example, includes user data to be transmitted to the base station 110 and a control signal for transmitting the user data.

The common signal generator 241 generates a common signal that includes the designated carrier information output from the designated carrier information generator 220, and outputs the generated common signal to the transmission signal generator 261. Similarly, the common signal generators 242 to 245 respectively generate common signals that include the designated carrier information output from the designated carrier information generator 220, and output the generated common signals to the transmission signal generator 261. Furthermore, each of the common signals generated by the common signal generators 241 to 245 may include a pilot signal.

The paging signal generator 250 generates a paging signal that pages mobile terminals that include the mobile terminal 120. For example, the paging signal generator 250 acquires mobile terminal paging information transmitted from a higher level system of the base station 110 and based on the acquired information, generates a paging signal. The paging signal generator 250 outputs the generated paging signal to the transmission signal generator (here, the transmission signal generator 262) that is among the transmission signal generators 261 to 265 and that generates a transmission signal for the designated carrier indicated by the designated carrier determiner 210.

The transmission signal generator 261 generates a transmission signal that is to be transmitted via carrier 10 and outputs the generated transmission signal to the wireless transmitter 270. For example, the transmission signal generator 261 generates a transmission signal that includes the user signal output from the user signal generator 231 and the common signal output from the common signal generator 241.

The transmission signal generator 262 generates a transmission signal that is to be transmitted via carrier 20 and outputs the generated transmission signal to the wireless transmitter 270. For example, the transmission signal generator 262 generates a transmission signal that includes the user signal output from the user signal generator 232, the common signal output from the common signal generator 242, and the paging signal output from the paging signal generator 250.

The transmission signal generators 26 to 265, similar to the transmission signal generator 261, respectively generate a transmission signal that is to be transmitted via carriers 30, 40, and 50, respectively, and output the generated transmission signals to the wireless transmitter 270. For example, the transmission signal generators 263 to 265 generate transmission signals that include the user signals output from the user signal generators 233 to 235 and the common signals respectively output from the common signal generators 243 to 245, respectively.

The wireless transmitter 270 wirelessly transmits each of the transmission signals output from the transmission signal generators 261 to 265, via carriers respectively corresponding to the transmission signals. For example, the wireless transmitter 270 wirelessly transmits, via carrier 10, the transmission signal output from the transmission signal generator 261. Similarly, the wireless transmitter 270 wirelessly transmits, via carriers 20, 30, 40, and 50, the transmission signals respectively output from the transmission signal generators 262 to 265.

In the configuration described above, the transmission signal generators 261, 263 to 265 and the wireless transmitter 270 form a first transmitter that transmits via the carriers that are not the designated carrier information indicating the designated carrier. The transmission signal generator 262 and the wireless transmitter 270 form a second transmitter that transmits the paging signal via the designated carrier.

The designated carrier determiner 210, the designated carrier information generator 220, the user signal generators 231 to 235, the common signal generators 241 to 245, the paging signal generator 250, and the transmission signal generators 261 to 265, for example, are implemented by a computing circuit such as a digital signal processor (DSP). Further, the wireless transmitter 270 is implemented by a wireless interface such as an antenna.

Figure 3:
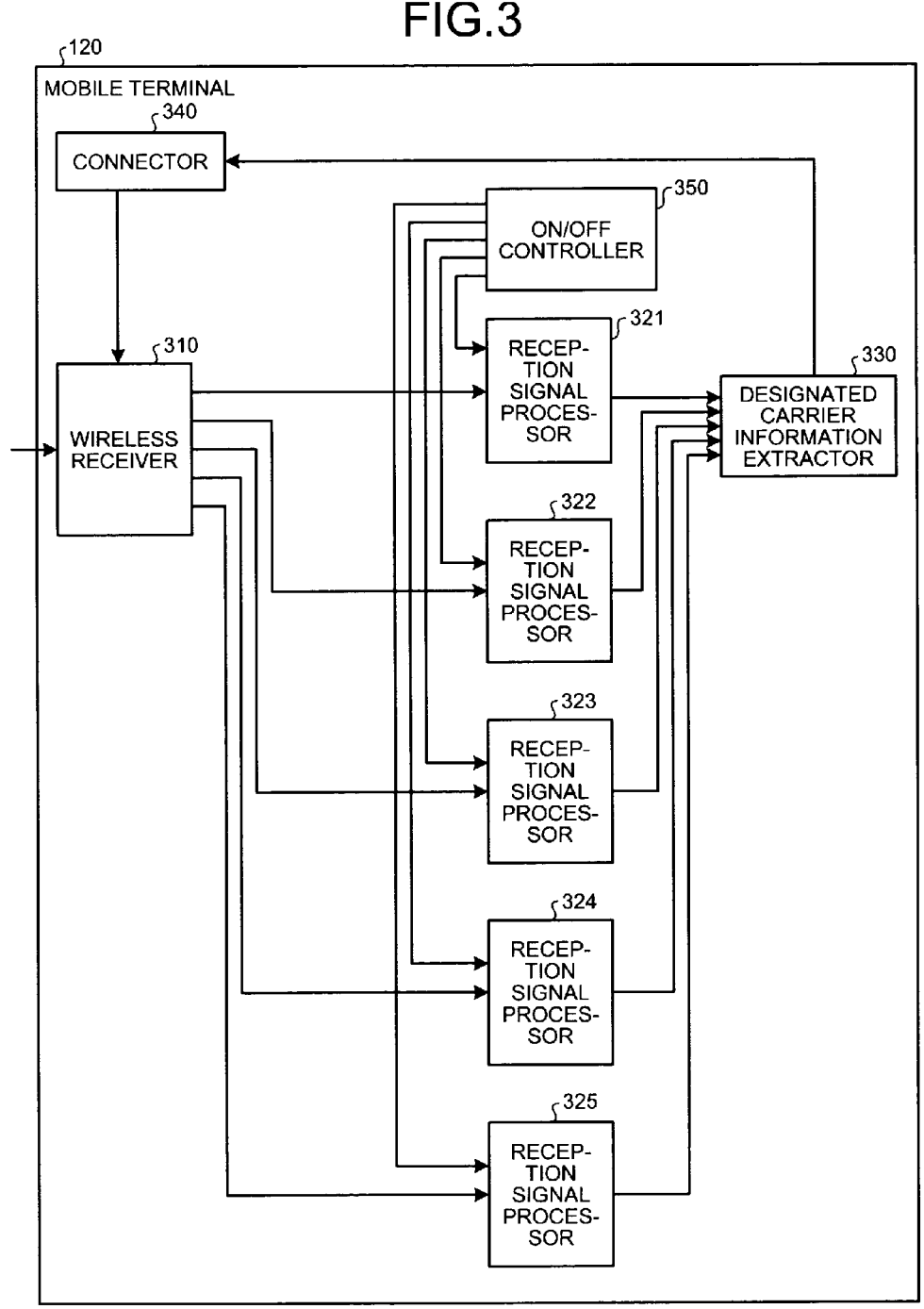
FIG. 3 is a block diagram of an example of a mobile terminal depicted in FIG. 1.

FIG. 3 is a block diagram of an example of the mobile terminal depicted in FIG. 1. As depicted in FIG. 3, the mobile terminal 120 includes a wireless receiver 310, reception signal processors 321 to 325, a designated carrier information extractor 330, a connector 340, and an on/off controller 350.

The wireless receiver 310 receives a signal via carriers transmitted from the base station 110. Further, under the control of the connector 340, the wireless receiver 310 selects a carrier for reception, among carriers 10, 20, 30, 40, and 50. The wireless receiver 310 outputs the received signal to the reception signal processors 321 to 325, respectively.

The reception signal processors 321 to 325 respectively perform reception processing on the signal output from the wireless receiver 310 and output the signal obtained by the reception processing to the designated carrier information extractor 330. Further, under the control of the on/off controller 350, each of the reception signal processors 321 to 325 respectively switches operation thereof on and off.

The designated carrier information extractor 330 extracts designated carrier information from the signals output from the reception signal processors 321 to 325. The designated carrier information extractor 330 outputs the extracted designated carrier information to the connector 340.

When the mobile terminal 120 is in the active mode, the connector 340 controls the wireless receiver 310 such that one carrier or multiple carriers that the mobile terminal 120 uses are received. Further, when the mobile terminal 120 is in the idle mode, the connector 340 controls the wireless receiver 310 such that the carrier indicated by the designated carrier information from the designated carrier information extractor 330 is received (inter-frequency handover within same cell).

For example, when the designated carrier information indicates the channel number "101" of carrier 20, based on channel number "101", the connector 340 calculates the frequency of carrier 20 and controls the wireless receiver 310 to receive a signal of the calculated frequency. Calculation of the frequency ($F_{DL}$) based on the channel number ($N_{DL}$) is performed, for example, by equation (1).

$$F_{DL}=F_{DL\_low}+0.1(N_{DL}-N_{offs-DL}) \quad (1)$$

In equation (1), $F_{DL\_low}$ represents the lowest frequency within the band of the base station 110. $N_{offs-DL}$ is a correction term for enabling the same equation to be used even for a different band. Further, for the calculation of frequency based on the channel number, for example, the method disclosed in nonpatent literature (3GPP TS36.106, V8.1.0, March 2009) may be used.

In this manner, the mobile terminal 120, based on the channel number, calculates the frequency of the designated carrier and connects to the carrier of the calculated frequency. The calculation of the frequency of the designated carrier from the channel number is performed using a computational formula such as equation (1). Such a computational formula, for example, is preliminarily stored to the memory of the mobile terminal 120.

The on/off controller 350 switches the operation of the reception signal processors 321 to 325 off and on. For example, when the mobile terminal 120 is in the active mode, the on/off controller 350 causes several of the reception signal processors 321 to 325 to operate, whereby parallel processing of reception signals for multiple carriers is performed. Further, when the mobile terminal 120 is in the idle mode, the on/off controller 350 causes one of the reception signal processors 321 to 325 (e.g., the reception signal processor 321) to operate.

In the configuration above, for example, the wireless receiver 310, the reception signal processor 321, and the designated carrier information extractor 330 form a first receiver that receives from the connected carrier, information indicating the designated carrier. The connector 340 is a connector that connects to the carrier that is indicated by the information received by first receiver.

Further, for example, the wireless receiver 310 and the reception signal processor 321 form a second receiver that receives the paging signal transmitted via the carrier to which the connector 340 is connected. The wireless receiver 310 is implemented by a wireless interface such as an antenna. The reception signal processors 321 to 325, the designated carrier information extractor 330, the connector 340, and the on/off controller 350, for example, are implemented by a computing circuit such as a DSP.

Figure 4:
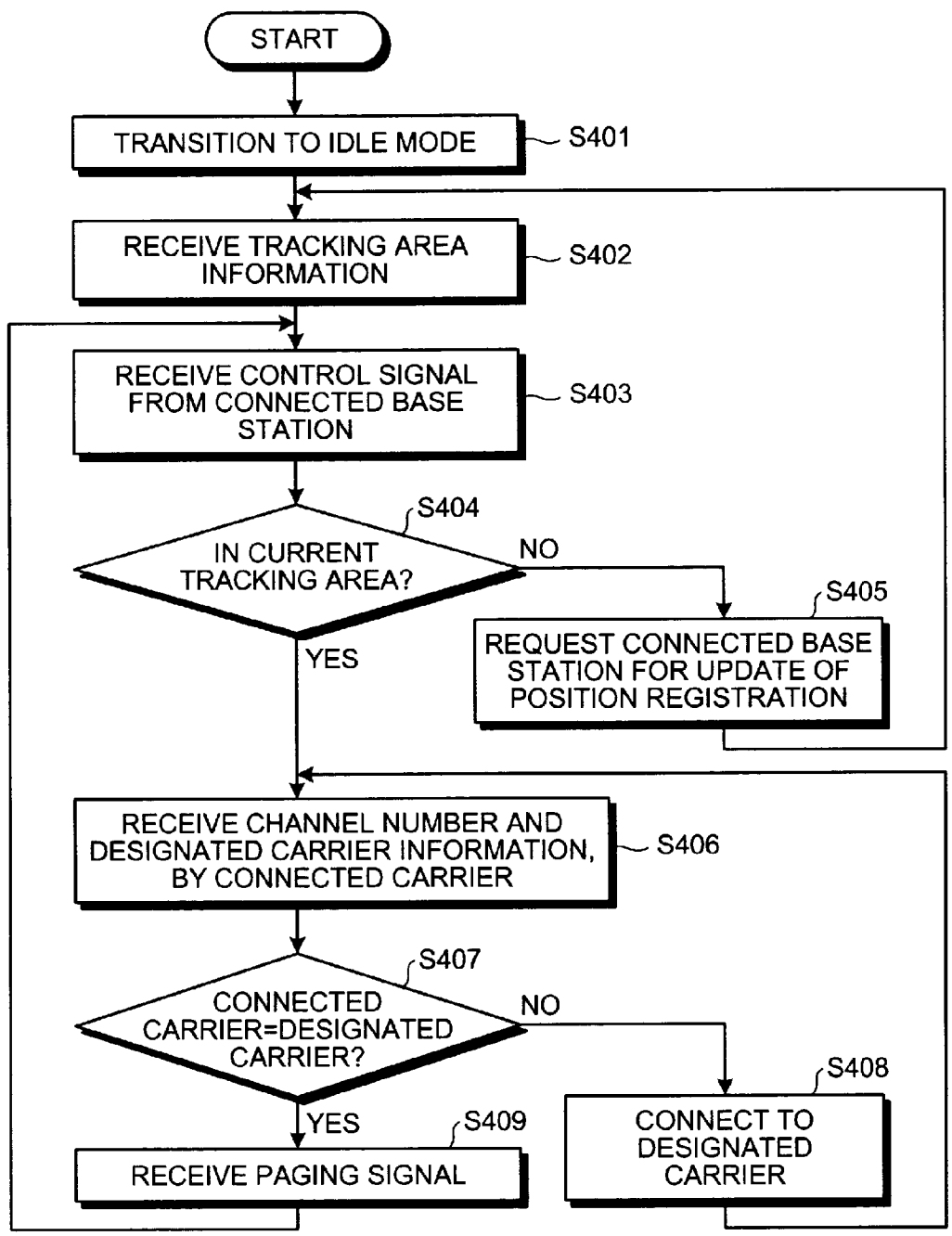
FIG. 4 is a flowchart of an example of operation of the mobile terminal depicted in FIG. 1.

FIG. 4 is a flowchart of an example of operation of the mobile terminal depicted in FIG. 1. As depicted in FIG. 4, the mobile terminal 120 transitions from the active mode to the idle mode (step S401) and receives tracking area information from the base station 110 (step S402). The mobile terminal 120 receives a control signal from the base station to which the mobile terminal 120 is connected (e.g., the base station 110) (step S403). The control signal received at step S403 includes identification (ID) that identifies the base station that has transmitted the control signal.

The mobile terminal 120 determines whether the mobile terminal 120 is still in the current tracking area (step S404). At step S404, the mobile terminal 120 determines whether the base station 110 ID included in the control signal received at step S402, is included in the updated tracking area information. If the ID is included in the tracking area information, the mobile terminal 120 determines that the mobile terminal 120 is within the tracking area and if the ID is not included in the tracking area information, the mobile terminal 120 determines that the mobile terminal 120 is not within the tracking area.

At step S404, if the mobile terminal 120 is not within the tracking area (step S404: NO), the mobile terminal 120 requests the connected base station 110 for update of position registration (step S405), and returns to step S402. As a result, the update of position registration for the mobile terminal 120 is performed by an upper layer of the base station 110 and new tracking area information for the mobile terminal 120 is transmitted to the mobile terminal 120, via the base station 110.

At step S404, if the mobile terminal 120 is still within the current tracking area (step S404: YES), the mobile terminal 120 receives the channel number and designated carrier information from the connected carrier (step S406). The mobile terminal 120 determines whether the connected carrier is the designated carrier that carries the paging signal (step S407).

At step S407, for example, determination is made based on whether the channel number and the designated carrier information received at step S406 coincide. For example, if the channel number and the designated carrier information coincide, the connected carrier is determined to be the designated carrier and if the channel number and designated carrier information do not coincide, the connected carrier is determined to not be the designated carrier.

At step S407, when the connected carrier is not the designated carrier (step S407: NO), the mobile terminal 120 connects to the carrier indicated by the designated carrier information received at step S406 (step S408), and returns to step S406. If the connected carrier is the designated carrier (step S407: YES), the mobile terminal 120 receives the paging signal from the connected carrier (step S409), and returns step S403.

Through the steps above, the reception of the paging signal (which is transmitted via the designated carrier from the base station 110) by the mobile terminal 120 is highly efficient. When the mobile terminal 120 is paged by the received paging signal, the mobile terminal 120 responds to a higher system, via the connected base station (e.g., the base station 110).

Further, when the mobile terminal 120 leaves the cell of the base station 110 and enters the cell of a new base station that is different from the base station 110, at step S403, the mobile terminal 120 receives a control signal from the new base station. If the new base station is a base station that is outside of the tracking area, the mobile terminal 120 proceeds to step S405. If the base station is a base station within the tracking area, the mobile terminal 120 proceeds to step S406.

Figure 5:
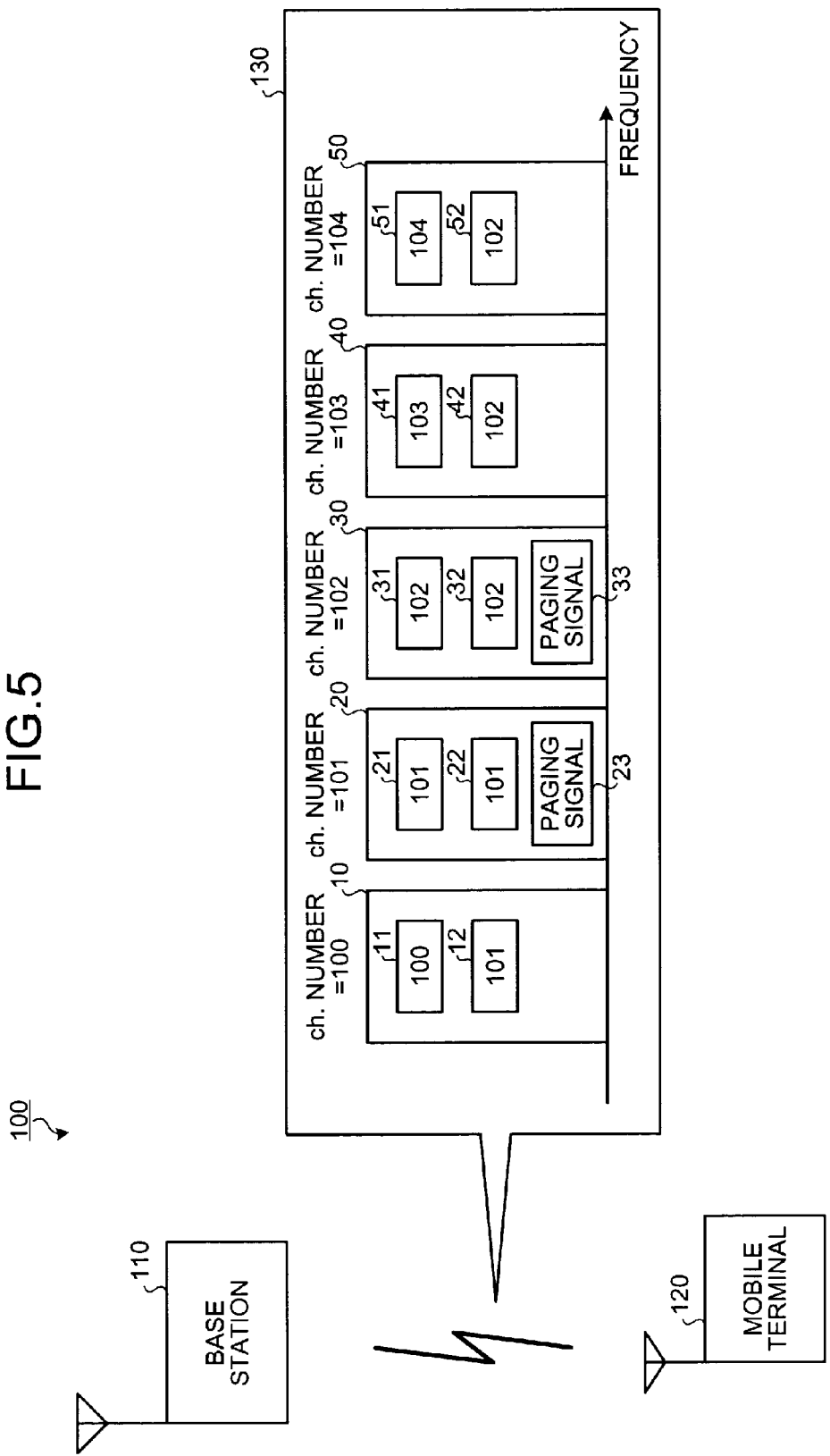
FIG. 5 is a diagram of a modification of the communication system depicted in FIG. 1.

FIG. 5 is a diagram of a modification of the communication system depicted in FIG. 1. In FIG. 5, components identical to those depicted in FIG. 1 are given the same reference numerals used in FIG. 1 and description thereof is omitted. In this example, the base station 110 includes the paging signal 23 in carrier 20, includes a paging signal 33 in carrier 30, and includes no paging signal in carriers 10, 40, and 50. The paging signal 23 and the paging signal 33, for example, are of the same content.

In this example, the designated carrier information 12 for carrier 10 and the designated carrier information 22 for carrier 20 indicate the channel number "101" of carrier 20, which is the designated carrier. The designated carrier information 32 for carrier 30, the designated carrier information 42 for carrier 40, and the designated carrier information 52 for carrier 50 indicate the channel number "102" of carrier 30, which is the designated carrier that includes the paging signal 33.

In this manner, configuration may be such that the base station 110 transmits paging signals (the paging signals 23, 33) via carrier 20 and carrier 30 (multiple carriers). In other words, multiple designated carriers (multiple carriers) may be included among the carriers 10, 20, 30, 40, and 50. In this case, carrier identification information of the other carriers (carriers 10, 40, and 50) is information indicating either carrier 20 or carrier 30.

The carrier identification information of carriers 10, 40, and 50 may be information indicating among carrier 20 and carrier 30, the carrier have a closer frequency. For example, since the frequency of carrier 10 is closer to that of carrier 20 than to that of carrier 30, the designated carrier information 12 for carrier 10 is information "101" indicating carrier 20. Further, since the frequency of carrier 40 is closer to that of carrier 30 than to that of carrier 20, the designated carrier information 42 for carrier 40 is information "102" indicating carrier 30. As a result, the magnitude by which reception frequency changes when connection to the connected carrier is changed to a designated monitor can be reduced.

In the first embodiment, although an example in which the designated carrier information is information indicating the channel number of the designated carrier has been described, configuration may be such that the designated carrier information is information that indicates the frequency of the designated carrier (similarly for the embodiments hereinafter). In this case, when the mobile terminal 120 is in the idle mode, the connector 340 controls the wireless receiver 310 to receive a signal of the frequency indicated by the designated carrier information from the designated carrier information extractor 330.

Figure 6:
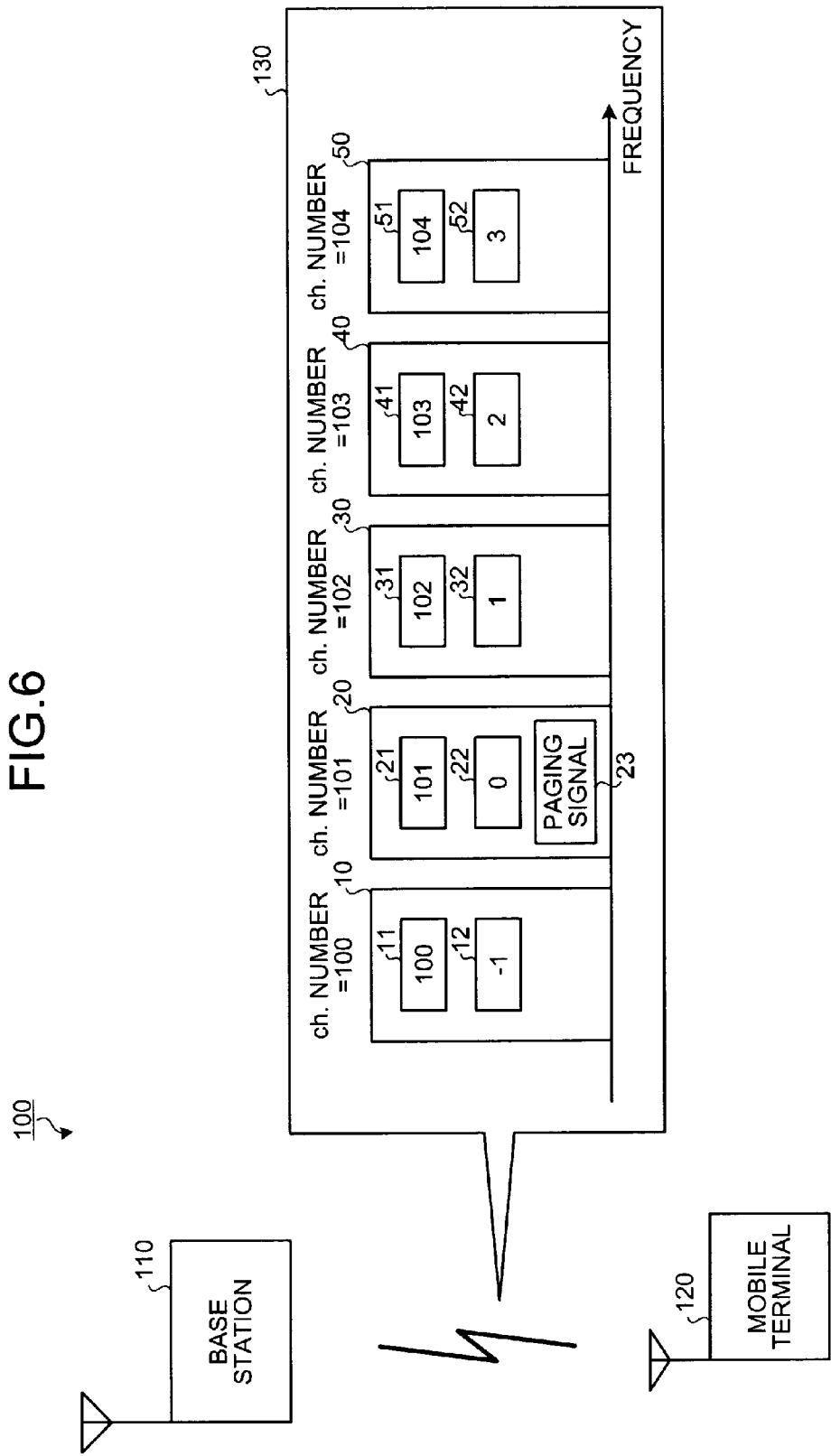
FIG. 6 is a diagram of the communication system according to a second embodiment.

FIG. 6 is a diagram of the communication system according to the second embodiment. In FIG. 6, components identical to those depicted in FIG. 1 are given the same reference numerals used in FIG. 1 and description thereof is omitted. As depicted in FIG. 6, the designated carrier information 12 for carrier 10, which is transmitted by the base station 110, indicates the difference "−1" of the channel number "100" of the carrier (carrier 10) and the channel number "101" of carrier 20, which is the designated carrier.

The designated carrier information 22 for carrier 20 indicates the difference "0" of the channel number "101" of the carrier (carrier 20) and the channel number "101" of carrier 20, the designated carrier. Similarly, the designated carrier information 32, 42, and 52 indicated the differences "1", "2", and "3" of the channel numbers of the carriers 30, 40, and 50 and the channel number "101" of carrier 20, which is the designated carrier.

In this manner, the designated carrier information 12, 22, 32, 42, 52 may be information that indicates the difference of the channel number assigned to the carrier that carries the designated carrier information and the channel number assigned to the designated carrier. As a result, the volume of the designated carrier information 12, 22, 32, 42, and 52 can be reduced.

Further, assuming that the mobile terminal 120 was connected to carrier 10 when the mobile terminal 120 transitioned to the idle mode, in this case, the mobile terminal 120 receives the channel number 11 and the designated carrier information 12 from carrier 10 and based on the channel number "100" indicated by the channel number 11 and the difference "−1" indicated by the designated carrier information 12, the mobile terminal 120 identifies the channel number "101". The mobile terminal 120 connects to carrier 20, which is indicated by channel number "101".

Figure 7:
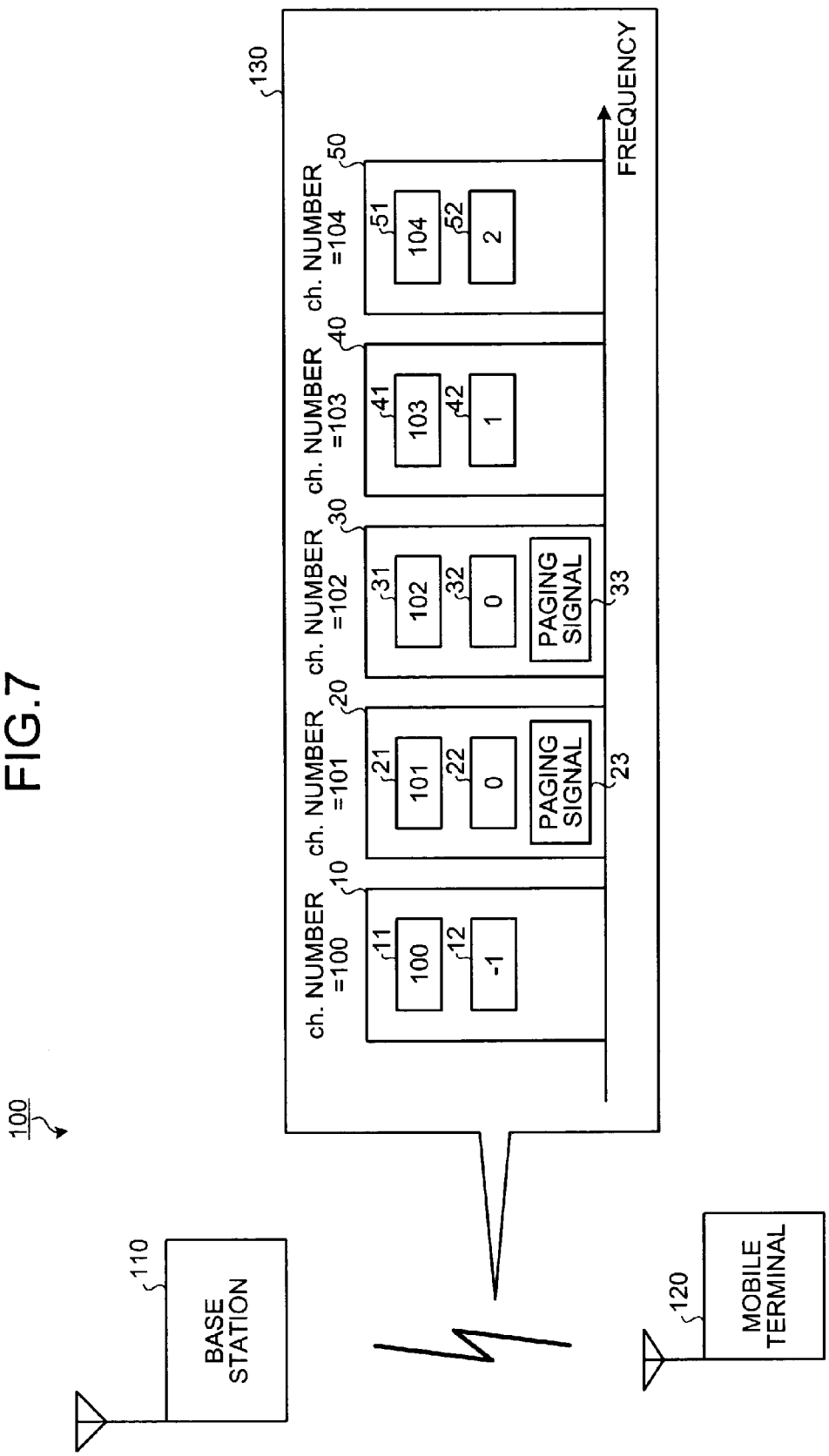
FIG. 7 is a diagram of a modification of the communication system depicted in FIG. 6.

FIG. 7 is a diagram of a modification of the communication system depicted in FIG. 6. In FIG. 7, components identical to those depicted in FIG. 6 are given the same reference numerals used in FIG. 6 and description thereof is omitted. In this example, the base station 110 includes the paging signal 23 in carrier 20, includes the paging signal 33 in carrier 30, and includes no paging signal in carriers 10, 40, and 50. The paging signal 23 and the paging signal 33 are of the same content.

In this example, the designated carrier information 12 for carrier 10 indicates the difference "−1" of channel number "100" of carrier 10 and the channel number "101" of carrier 20, which is the designated carrier. The designated carrier information 22 for carrier 20 indicates the difference "−1" of the channel number "101" of carrier 20 and the channel number "101" of carrier 20, which is the designated carrier.

The designated carrier information 32, 42, and 52 respectively indicate the differences "0", "1", and "2" of the channel numbers "102", "103", and "104" of carriers 30, 40, and 50 and the channel number "102" of carrier 30, which includes the paging signal 33.

In this manner, in the example depicted in FIG. 6, the designated carrier information 12, 22, 32, 42, and 52 may be information that indicates the difference of the channel number assigned to the carrier that carries the designated carrier information and the channel number assigned to the designated carrier. Further, in the example depicted in FIG. 6, carrier identification information of carriers 10, 40, and 50 may be information that indicates among carrier 20 and carrier 30, the carrier closest in frequency.

Figure 8:
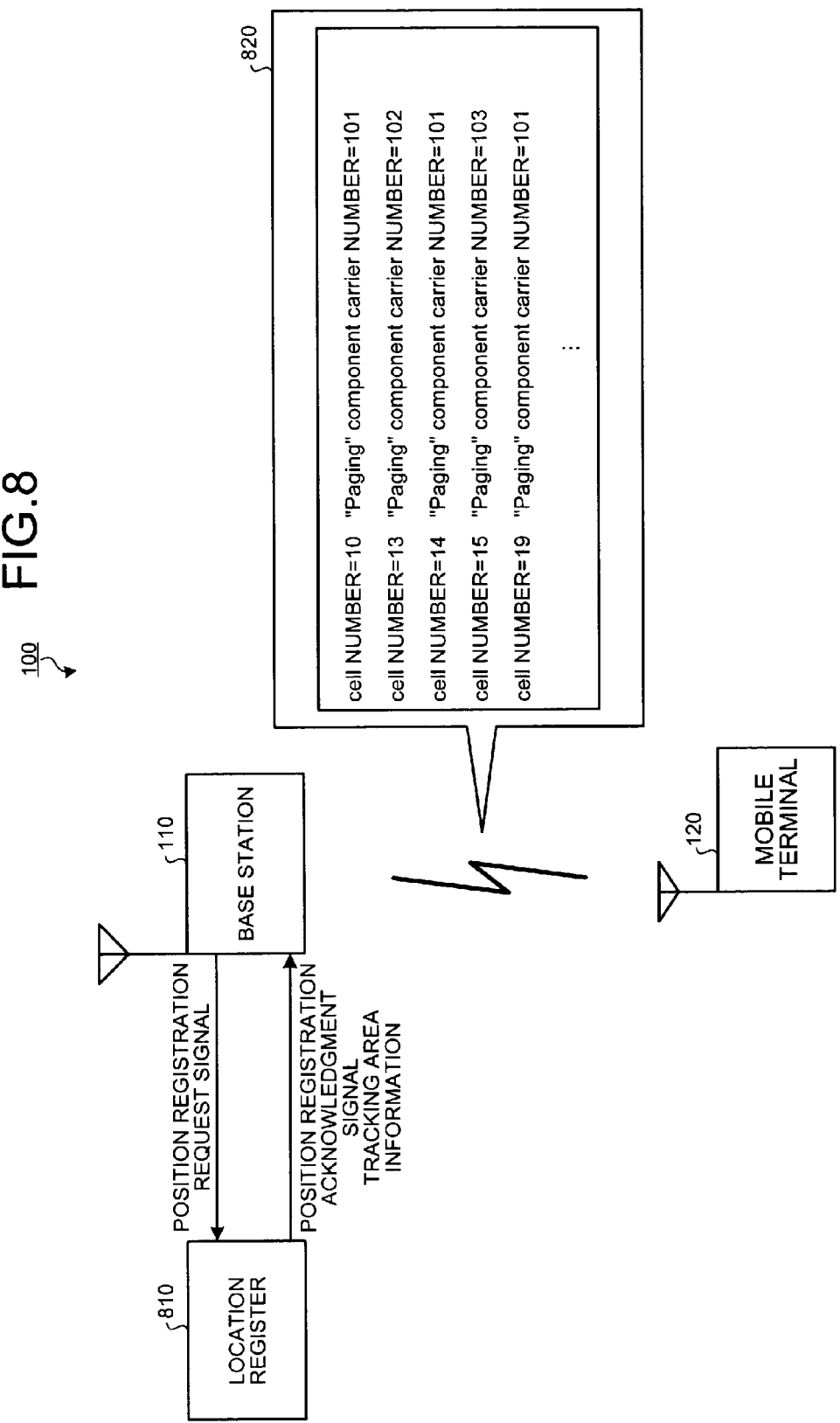
FIG. 8 is a diagram of the communication system according to a third embodiment.

FIG. 8 is a diagram of the communication system according to a third embodiment. In FIG. 8, components identical to those depicted in FIG. 1 are given the same reference numerals used in FIG. 1 and description thereof is omitted. As depicted in FIG. 8, the communication system 100 according to the third embodiment includes the base station 110, the mobile terminal 120, and a location register 810. When the mobile terminal 120 transitions to the idle mode, the base station 110 transmits to the location register 810, a position registration request signal requesting position registration of the mobile terminal 120.

The location register 810 is a higher system of the base station 110 and performs movement registration for each mobile terminal within the cell of the base station 110. The location register 810, upon receiving the position registration request signal from the base station 110 and concerning the mobile terminal 120, performs position registration of determining the tracking area of the mobile terminal 120. The location register 810 transmits to the base station 110, a position registration acknowledgment signal indicating that position registration has been performed and tracking area information indicating each base station included in the determined tracking area of the mobile terminal 120.

The base station 110, upon receiving the tracking area information from the location register 810, generates correspondence information 820 correlating the base stations indicated in the tracking area information and the designated carrier for each base station. For example, the memory of the base station 110 stores the designated carrier for each base station. The base station 110 generates the correspondence information 820, based on the tracking area information received from the location register 810 and the designated carrier for each base station, stored in the memory.

Alternatively, the base station 110 acquires for each base station included in the tracking area information received from the location register 810, designated carrier information, by referring to identification information of each base station. The base station 110 generates the correspondence information 820, based on the tracking area information received from the location register 810 and the designated carrier information of each base station.

The base station 110 transmits the generated correspondence information 820 to the mobile terminal 120. As depicted in FIG. 8, in the correspondence information 820, the cell number of each base station included in the tracking area and the number of the designated carrier that includes paging signal are correlated. For example, the cell number of the base station 110 (cell number=10) is correlated with the number of the designated carrier ("Paging" component carrier number=101), which indicates that the channel number of the designated carrier of the base station 110 is "101".

When the mobile terminal 120 transitions to the idle mode, the mobile terminal 120, based on the correspondence information 820 transmitted from the base station 110, connects to the designated carrier of the base station (e.g., the base station 110) to which the mobile terminal 120 was connected and receives the paging signal transmitted via the designated carrier. Further, when the mobile terminal 120 connects to a different base station in the tracking area, the mobile terminal 120, based on the correspondence information 820, connects to the designated carrier of the connected base station and receives the paging signal transmitted via the designated carrier.

In this manner, by the base station 110 transmitting the designated carrier information indicating carrier 20, which transmits the paging signal, and the tracking area information, the mobile terminal 120 can easily connect to carrier 20, which carries the paging signal, thereby enabling highly efficient transmission of the paging signal.

Concerning the configuration of the base station 110 depicted in FIG. 6, for example, a configuration is assumed that in addition to the configuration of the base station 110 depicted in FIG. 2, includes a generator that generates the correspondence information 820 and a transmitter that transmits to the mobile terminal 120, the correspondence information 820 generated by the generator. However, the designated carrier information generator 220 depicted in FIG. 2 may be omitted. The generator in the base station 110, for example, is implemented by a computing device such as a DSP. The transmitter in the base station 110, for example, is implemented by a wireless interface such as an antenna.

Concerning the configuration of the mobile terminal 120 depicted in FIG. 6, a configuration is assumed that, for example, in addition to the configuration of the mobile terminal 120 depicted in FIG. 3, includes a receiver that receives the correspondence information 820. The receiver in the mobile terminal 120, for example, is implemented by a wireless interface such as an antenna. However, the designated carrier information extractor 330 depicted in FIG. 3 may be omitted. In this case, the connector 340 connects to the designated carrier of the connected base station, based on the correspondence information 820 received by the receiver.

Figure 9:
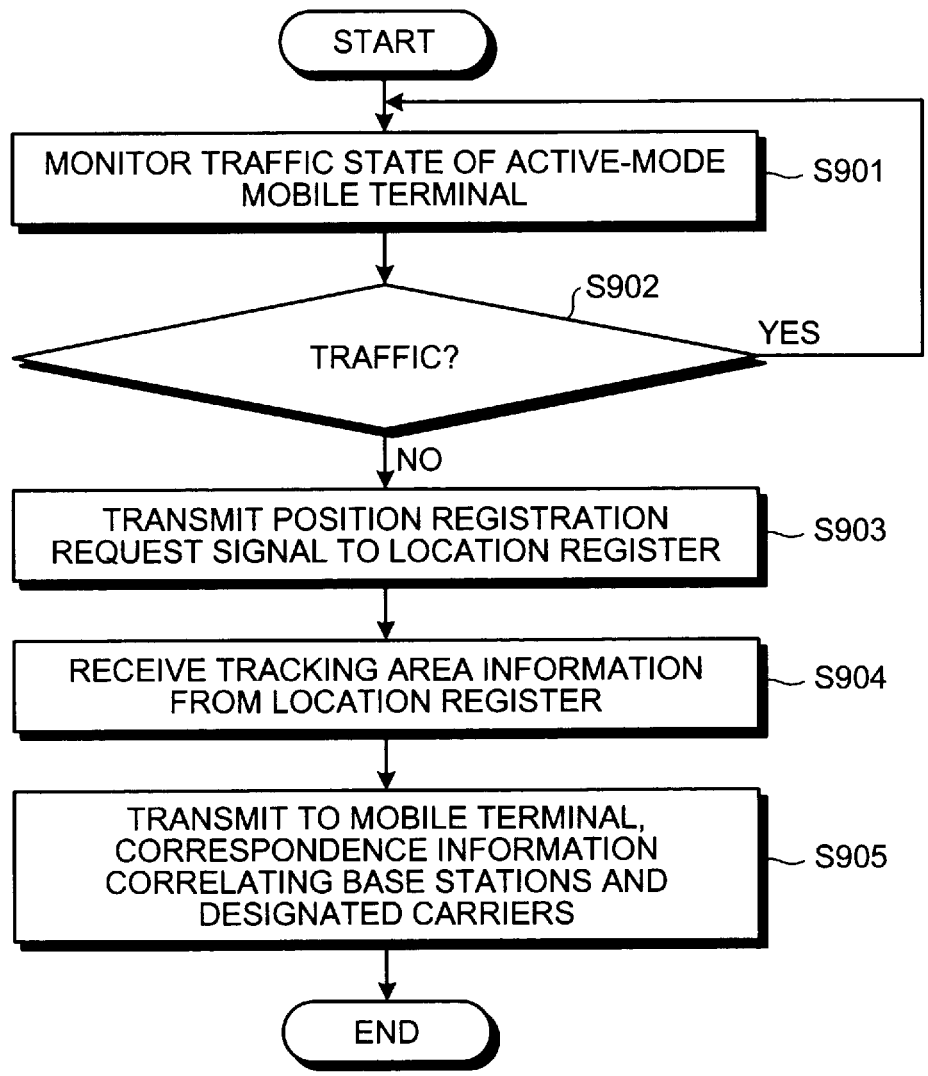
FIG. 9 is a flowchart of an example of the operation of the base station depicted in FIG. 8.

FIG. 9 is a flowchart of an example of the operation of the base station depicted in FIG. 8. As depicted in FIG. 9, the base station 110 periodically monitors the traffic state of the mobile terminal 120, which is in the active mode (step S901). The base station 110 determines whether there is traffic of the mobile terminal 120, based on the monitoring results at step S901 (step S902).

At step S902, if there is mobile terminal 120 traffic (step S902: YES), the base station 110 returns to step S901. If there no mobile terminal 120 traffic (step S902: NO), the base station 110 transmits to the location register 810, a position registration request signal requesting position registration (step S903).

The base station 110 receives from the location register 810, a position registration acknowledgment signal in response to the position registration request signal transmitted at step S903 and tracking area information of the mobile terminal 120 (step S904). The base station transmits to the mobile terminal 120, the correspondence information 820 correlating the base stations included in the tracking area information received at step S904 and the designated carrier of the base stations (step S905), ending the series of operations.

By the above operations, when there is no mobile terminal 120 traffic for a given period of time, the base station 110 can transmit to the mobile terminal 120, the correspondence information 820 obtained from the results of position registration by the location register 810. Further, when there is no traffic for a given period of time, the mobile terminal 120 transitions from the active mode to the idle mode. Operation the mobile terminal 120 that has transitioned to the idle mode will be described.

Figure 10:
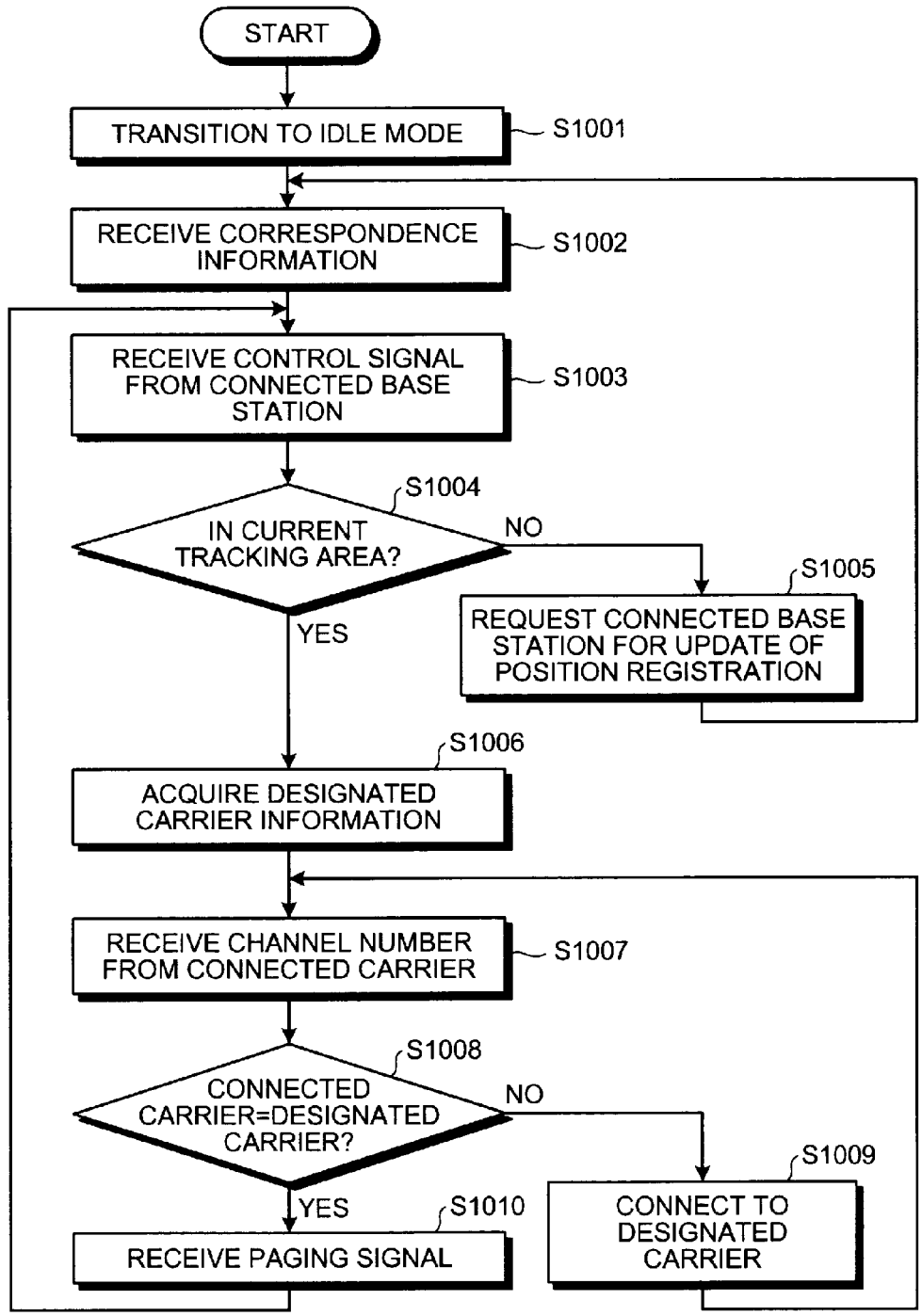
FIG. 10 is a flowchart of an example of operation of the mobile terminal depicted in FIG. 8.

FIG. 10 is a flowchart of an example of operation of the mobile terminal depicted in FIG. 8. As depicted in FIG. 10, the mobile terminal 120 transitions from the active mode to the idle mode (step S1001) and receives the correspondence information 820 from the base station 110 (step S1002). The correspondence information 820 includes tracking area information that indicates each of the base stations included in the tracking area of the mobile terminal 120 (see FIG. 9).

Steps S1003 to S1005 depicted in FIG. 10 are identical to steps S403 to S405 depicted in FIG. 4 and description thereof is omitted. At step S1004, if the mobile terminal 120 is still in the current tracking area (step S1004: YES), the mobile terminal 120 proceeds to step S1006. In other words, from the correspondence information 820 received at step S1002, the mobile terminal 120 acquires the designated carrier information correlated with the base station 110 ID included in the control signal received at step S1003 (step S1006).

The mobile terminal 120 receives the channel number from the connected carrier (step S1007), and determines whether the connected carrier is the designated carrier carrying the paging signal (step S1008). At step S1008, for example, the mobile terminal 120 determines whether designated carrier information acquired at step S1006 and the channel number received at step S1007 coincide.

At step S1008, if the connected carrier is not the designated carrier (step S1008: NO), the mobile terminal 120 connects to the designated carrier indicated by the designated carrier information acquired at step S1006 (step S1009), and returns to step S1007. If the connected carrier is the designated carrier (step S1008: YES), the mobile terminal 120 receives the paging signal from the carrier (step S1010), and returns to step S1003.

By the steps above, the mobile terminal 120 can perform highly efficient reception of the paging signal transmitted via the designated carrier from the base station 110. When the mobile terminal 120 is paged by the received paging signal, the mobile terminal 120 responds to a higher system, via the base station 110.

Figure 11:
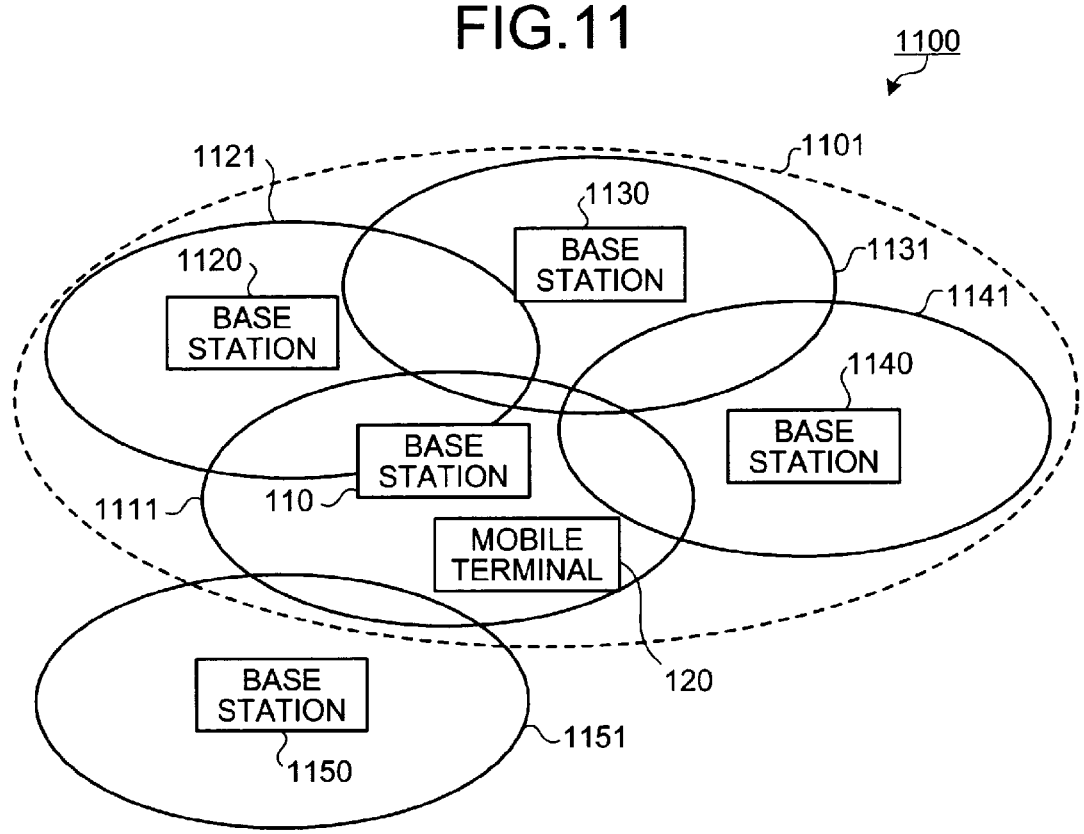
FIG. 11 is a diagram of an example of a communication system that includes multiple base stations.

FIG. 11 is a diagram of an example of a communication system that includes multiple base stations. As depicted in FIG. 11, a communication system 1100 includes base stations 110, 1120, 1130, and 1140, and 1150. Cells 1111, 1121, 1131, 1141, and 1151 are respectively the cells of the base stations 110, 1120, 1130, and 1140. A tracking area 1101 is the tracking area of the mobile terminal 120. In this example, the base stations 110, 1120, 1130, and 1140 are included in the tracking area 1101.

For example, the base station 110 is the base station 110 depicted in FIG. 1, FIG. 6, or FIG. 8; and the mobile terminal 120 is connected to the base station 110. When the mobile terminal 120 is paged, a paging signal for the mobile terminal 120 is transmitted via the designated carrier of each of the base stations 110, 1120, 1130, and 1140. The mobile terminal 120 receives the paging signal transmitted via the designated carrier of the base station 110 and based on the received paging signal, responds to a higher system.

Further, when the mobile terminal 120 moves to cell 1151, since the base station 1150 is a base station that is not included in the tracking area 1101, for example, the position registration of the mobile terminal 120 is updated according to the correspondence information 820 depicted in FIG. 8. As a result, the group of base stations that includes the base station 1150 is determined as the new tracking area of the mobile terminal 120.

Figure 12:
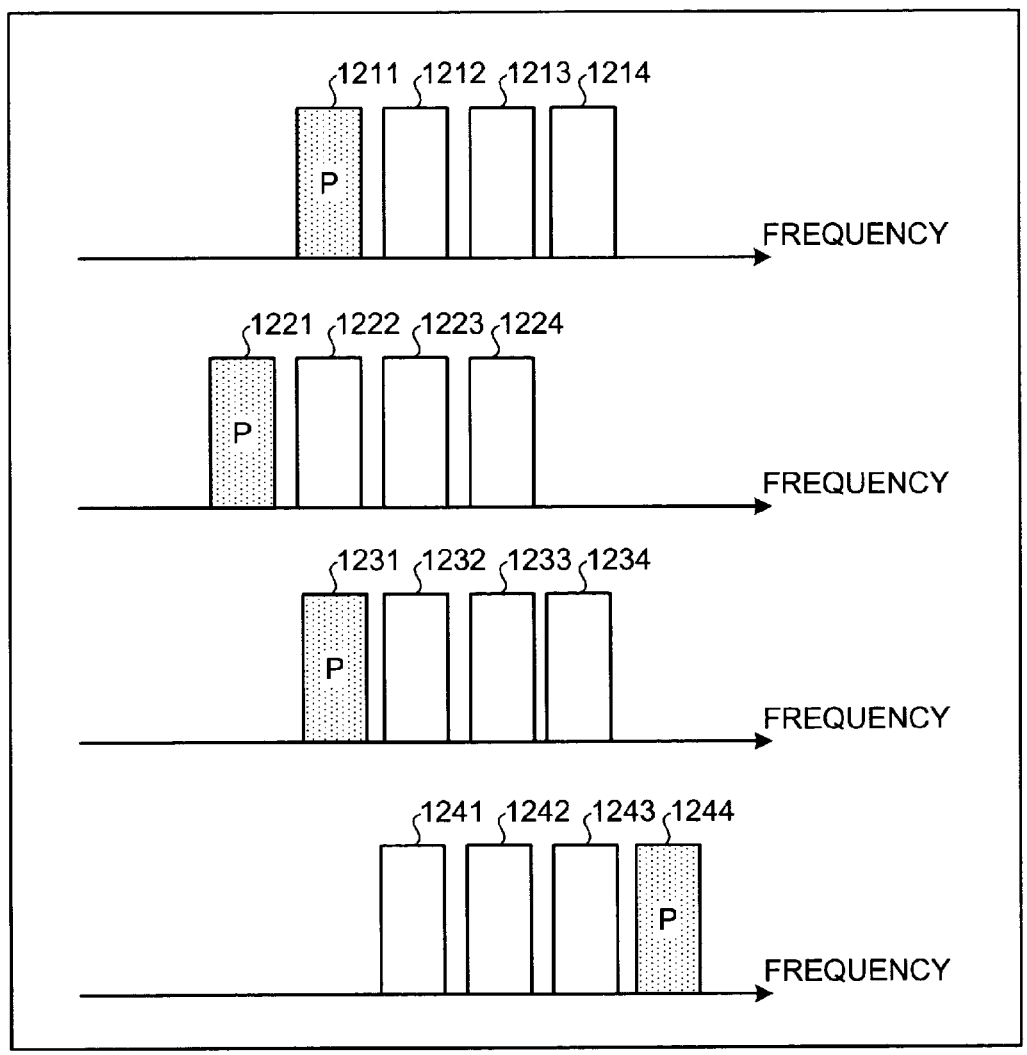
FIG. 12 is a diagram of component carriers transmitted from base stations.

FIG. 12 is a diagram of the component carriers transmitted from the base stations. Carriers 1211 to 1214, for example, are carriers transmitted from the base station 110 depicted in FIG. 11. Carriers 1221 to 1224, for example, are carriers transmitted from the base station 1120 depicted in FIG. 11. Carriers 1231 to 1234, for example, are carriers transmitted from the base station 1130 depicted in FIG. 11. Carriers 1241 to 1244, for example, are carriers transmitted from the base station 1140 depicted in FIG. 11.

As depicted in FIG. 12, among the base stations 110, 1120, 1130, and 1140, the frequency of each designated carrier carrying the paging signal (P) may differ. For example, for the base station 110, carrier 1211 is the designated carrier. For the base station 1120, carrier 1221 is the designated carrier. For the base station 1130, carrier 1231 is the designated carrier. For the base station 1140, carrier 1244 is the designated carrier.

In this case as well, according to the base station 110 and the mobile terminal 120, the designated carrier (carrier 1211, carrier 1221, carrier 1231, or carrier 1244) can be identified at the mobile terminal 120. Consequently, the mobile terminal 120 can perform highly efficient reception of the paging signal (P).

As described, according to the communication system, the base station, the mobile terminal, and the communication method, by the reception of a paging signal from a designated carrier(s) among multiple carriers, the efficiency of wireless resource utilization can be improved. Further, the mobile terminal can easily connect to the designated carrier carrying the paging signal, whereby the mobile terminal can perform highly efficient reception of the paging signal. Further, for example, compared to a case where the mobile terminal receives all of the carriers, power consumption of the mobile terminal can be reduced. In this manner, according to the communication system, the base station, the mobile terminal, and the communication method, highly efficient transmission and reception of paging signals can be performed.

In the communication system 100, the base station 110 may transmit via the designated carrier of the base station 110, correspondence information that correlates base stations adjacent to the base station 110 and the designated carriers of the adjacent base stations. Base stations adjacent to the base station 110, for example, are base stations having cells adjacent to the base station 110. For example, in the communication system 100 depicted in FIG. 1, the base station 110 transmits via carrier 20, correspondence information correlating the IDs of the base stations 1120, 1130, 1140, and 1150 and designated carrier information indicating the designated carrier of each of the base stations.

The mobile terminal 120 receives the paging signal 23 and the correspondence information via carrier 20. When the mobile terminal 120 moves from the cell of the base station 110 to the cell of any one of the base stations 1120, 1130, 1140, 1150, the mobile terminal 120 connects to the carrier indicated by the designated carrier information correlated, in the correspondence information, to the base station of the cell to which the mobile terminal 120 moved. Consequently, when the mobile terminal 120 performs handover to another base station, the mobile terminal 120 can quickly connect to the designated carrier of the target base station and perform highly efficient reception of the paging signal.

Further, in the communication system 100, the base station 110 may transmit via the designated carrier of the base station 110, correspondence information that correlates base stations included in the tracking area of the mobile terminal 120 and the designated carrier of the base stations. For example, in the communication system 100 depicted in FIG. 1, the base station 110 transmits via carrier 20, correspondence information correlating the IDs of the base stations 1120, 1130, and 1140 and the designated carrier information indicating the respective designated carriers of the base stations.

The mobile terminal 120 receives the paging signal 23 and the correspondence information via carrier 20. When the mobile terminal 120 moves from the cell of the base station 110 to the cell of any one of the base stations 1120, 1130, and 1140, the mobile terminal 120 connects to the carrier indicated by the designated carrier information correlated, in the correspondence information, to the base station of the cell to which the mobile terminal 120 moved. As a result, when the mobile terminal 120 performs handover to another base station, the mobile terminal 120 can quickly connect to the designated carrier of the target base station and perform highly efficient reception of the paging signal.

Although the communication system 100 and the communication system 1100 are, for example, LTE-A communication systems, the communication system 100 and the communication system 1100 are applicable to a communication system that uses multiple wireless carriers similar to LTE-A. Further, although the above carriers (component carriers) are, for example, LTE-A specified component carriers, the carriers are applicable to wireless carriers that can be used simultaneously similar to LTE-A specified component carriers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system that transmits a paging signal from a base station to a mobile terminal, via a designated carrier among a plurality of carriers, the communication system comprising:
 the base station that transmits the paging signal via the designated carrier, and further transmits via a carrier that is among the carriers and not the designated carrier, information that indicates the designated carrier; and the mobile terminal that based on the information received via a carrier to which the mobile terminal is connected, connects to the designated carrier and receives the paging signal transmitted via the designated carrier, wherein the base station transmits the information that indicates the difference of the channel number of the carrier that carries the information and the channel number assigned to the designated carrier.

2. The communication system according to claim 1, wherein each of the carriers is assigned a different channel number, and the base station transmits the information that indicates the channel number assigned to the designated carrier.

3. The communication system according to claim 2, wherein the carriers are of a different frequency, respectively, and the mobile terminal, based on the channel number, calculates the frequency of the designated carrier and connects to the carrier of the calculated frequency.

4. The communication system according to claim 1, wherein the carriers are of a difference frequency, respectively.

5. The communication system according to claim 4, wherein the base station transmits the information that indicates the frequency of the designated carrier.

6. The communication system according to claim 4, wherein a plurality of the designated carrier is included among the carriers, and the base station transmits information that indicates among the designated carriers, any one designated carrier and/or a designated carrier of a frequency that is close to the frequency of the carrier that is not the designated carrier.

7. The communication system according to claim 1, wherein the communication system is a Long Term Evolution-Advanced communication system.

8. The communication system according to claim 7, wherein the carriers are component carriers.

9. A base station of a communication system that transmits a paging signal from the base station to a mobile terminal, via a designated carrier among a plurality of carriers, the base station comprising:

a first transmitter that transmits via a carrier that is among the carriers and not the designated carrier, information that indicates the designated carrier; and a second transmitter that transmits the paging signal, via the designated carrier, wherein the base station transmits the information that indicates the difference of the channel number of the carrier that carries the information and the channel number assigned to the designated carrier.

10. A mobile terminal of a communication system that transmits a paging signal from a base station to the mobile terminal, via a designated carrier among a plurality of carriers, the mobile terminal comprising:

a first receiver that receives via a carrier to which the mobile terminal is connected, information indicating the designated carrier;

a connector that connects to a carrier indicated by the information received by the first receiver; and a second receiver that receives the paging signal transmitted via the carrier connected to by the connector, wherein the base station transmits the information that indicates the difference of the channel number of the carrier that carries the information and the channel number assigned to the designated carrier.

11. A communication method of a communication system that transmits a paging signal from a base station to a mobile terminal, via a designated carrier among a plurality of carriers, the communication method comprising:

first transmitting by the base station and via a carrier that is among the carriers and not the designated carrier, information that indicates the designated carrier;

connecting to the designated carrier by the mobile terminal, based on information that is among the information transmitted at the first transmitting and received via a carrier to which the mobile terminal is connected;

second transmitting by the base station, the paging signal via the designated carrier; and receiving by the mobile terminal and via the carrier to which the mobile terminal is connected at the connecting, the paging signal transmitted at the second transmitting, wherein the base station transmits the information that indicates the difference of the channel number of the carrier that carries the information and the channel number assigned to the designated carrier.

* * * * *